United States Patent [19]

Ono

[11] Patent Number: 4,558,686

[45] Date of Patent: Dec. 17, 1985

[54] MACHINING DEVICE EQUIPPED WITH BLADE INSPECTING MEANS

[75] Inventor: Takatoshi Ono, Nagareyama, Japan

[73] Assignee: Disco Abrasive Systems, Ltd., Japan

[21] Appl. No.: 574,814

[22] Filed: Jan. 30, 1984

[30] Foreign Application Priority Data

Feb. 7, 1983 [JP] Japan ............................. 58-17070[U]

[51] Int. Cl.$^4$ .............................................. B28D 1/04
[52] U.S. Cl. ............................ 125/13 R; 51/134.5 R;
 51/165 R; 51/165.87; 51/267; 51/165.72
[58] Field of Search ............................... 125/13 R, 14;
 51/134.5 R, 165.72, 165.87, 165 R, 267

[56] References Cited

U.S. PATENT DOCUMENTS

| | | | |
|---|---|---|---|
| 3,250,043 | 5/1966 | Finkl | 51/134.5 R |
| 3,560,826 | 2/1971 | Lonaberger | 51/134.5 R |
| 3,835,591 | 9/1974 | Cimprich | 51/165.72 |
| 4,016,855 | 4/1977 | Mimata | 125/13 R |

Primary Examiner—Harold D. Whitehead
Attorney, Agent, or Firm—Beveridge, DeGrandi & Weilacher

[57] ABSTRACT

A machining device equipped with a rotating machining tool having a blade. A blade inspecting means is provided in the machining device. The blade inspecting means comprises an emission means for emitting electromagnetic radiation and a receiving means for receiving the electromagnetic radiation emitted by the emitting means and producing a signal corresponding to the received electromagnetic radiation. The emitting means and receiving means are disposed such that the electromagnetic radiation emitted from the emitting means undergoes interference by the blade of the machining tool and the electromagnetic radiation received by the receiving means varies according to a variation in the condition of the blade.

10 Claims, 4 Drawing Figures

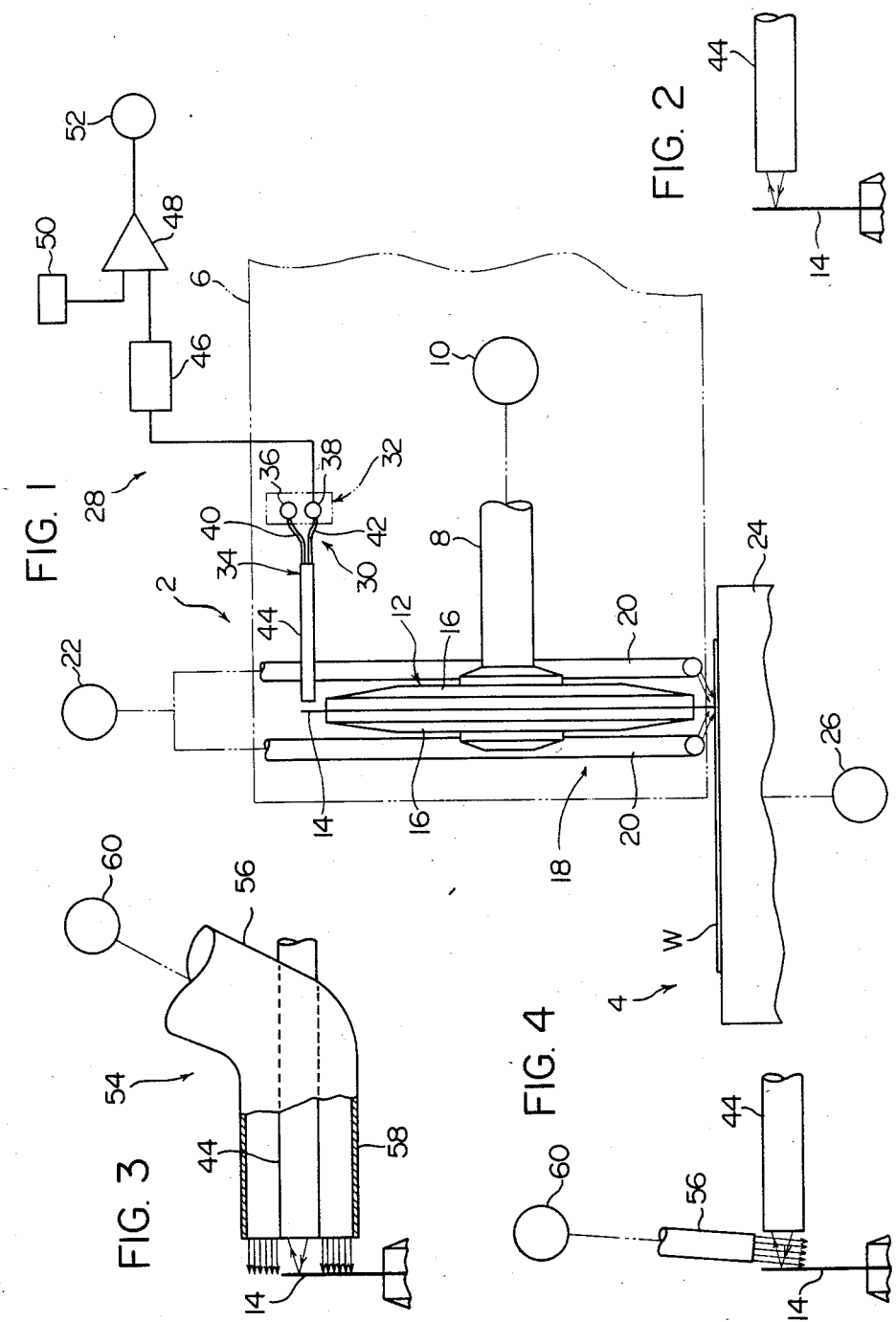

MACHINING DEVICE EQUIPPED WITH BLADE INSPECTING MEANS

FIELD OF THE INVENTION

This invention relates to a machining device equipped with a rotating machining tool having a blade, and more specifically, although not exclusively, to a machining device suitable for machining a semiconductor wafer, a magnetic head, etc. with the blade by rotating the rotating machining tool at high speed.

DESCRIPTION OF THE PRIOR ART

As is well known to those skilled in the art, it is necessary in the production of semiconductor devices to cut a semiconductor wafer along lattice-like cutting lines (generally called streets) to divide it into many rectangular areas. Each of the rectangular areas is generally called a chip and has a circuit pattern. In the production of a magnetic head, precision machining operations such as grooving or slicing are performed on metallic materials.

Usually, a machining device known as a dicing saw or a slicer is used for the aforesaid cutting of semiconductor wafers or the precision machining of metallic materials. This machining device includes a rotating machining tool mounted rotatably about a central axis as a center and having a blade in the form of a sufficiently thin annular plate, a driving source for rotating the machining tool, and a holding member for holding a workpiece. Usually, the blade is made by bonding superabrasives such as synthetic or natural diamond abrasive grains or cubic boron nitride abrasive grains by a suitable technique such as electrodeposition, resin bonding or metal bonding. In this type of machining device, the holding member and the machining tool are moved relative to each other manually or automatically to cause the blade of the rotating machining tool to act on the workpiece held by the holding member and thereby perform the desired machining on the workpiece.

The conventional machining device described above, however, has the following problems to be solved. In order to machine the workpiece sufficiently precisely as desired, the blade should be in a proper condition. If through long-term use, the blade is excessively worn, or deformed or broken, it will fail to machine the workpiece properly. In the conventional machining device, it is left to the operator's visual inspection to determine whether the blade is in a proper condition or not. This inspection is considerably difficult, and it is not rare that comparatively expensive workpieces are cut by improperly shaped blades and become useless.

SUMMARY OF THE INVENTION

It is a primary object of this invention, therefore, to provide a novel and excellent machining device, suitable for machining a semiconductor wafer, a magnetic head, etc. in particular, which is equipped with a blade inspecting means capable of automatically detecting an improper condition of a cutting blade.

Another object of this invention is to provide a novel and excellent machining device equipped with a blade inspecting means capable of automatically inspecting the condition of a cutting blade and detecting its improper condition even when a fog of a cooling liquid and/or machining dust occurs in the ambient atmosphere of the blade.

According to this invention, there is provided a machining device comprising a rotatable machining tool mounted for rotating about a central axis as a center and having a blade, a driving source for rotating the machining tool and a holding member for holding a workpiece, said holding member and said machining member being adapted to be moved relative to each other whereby the blade of the rotatable machining tool acts on the workpiece held by the holding member; said machining device further comprising a blade inspecting means including an emitting means for emitting electromagnetic radiation and a receiving means for receiving the electromagnetic radiation from the emitting means and producing a signal corresponding to the received electromagnetic radiation, said emitting means and receiving means being disposed such that the electromagnetic radiation emitted from the emitting means undergoes interference by the blade of the machining tool and the electromagnetic radiation received by the receiving means is varied according to a variation in the condition of the blade In a preferred embodiment of the invention, the emitting means includes a light-emitting element, and the receiving means includes a light-receiving element. The blade inspecting means includes means for producing a gaseous stream in the path of electromagnetic radiation between the emitting means and receiving means and the blade.

Various other objects of this invention and various technical advantages achieved by the present invention will become apparent from the following description.

BRIEF DESCRIPTION OF THE DRAWINGS

FIG. 1 is a simplified side elevation showing one embodiment of the machining device constructed in accordance with this invention;

FIG. 2 a simplified partial view showing a blade inspecting means provided in the machining device shown in FIG. 1;

FIG. 3 is a simplified partial view showing a modified example of the blade inspecting means; and FIG. 4 is a simplified partial view showing a modified example of an air stream forming means in the blade inspecting means.

DETAILED DESCRIPTION OF THE PREFERRED EMBODIMENTS

The invention will be described below in detail with reference to the accompanying drawings showing one specific embodiment of the machining device constructed in accordance with this invention.

With reference to FIG. 1, the illustrated machining device suitable, for example, for cutting a semiconductor wafer along "streets", or lattice-like cutting lines, includes a machining tool assembly shown generally at 2 and a holder assembly shown generally at 4.

The machining tool assembly 2 has a supporting frame 6 shown in a simplified form by a two-dot chain line. The supporting frame 6 is mounted such that its position in a substantially perpendicular direction, i.e. its height, can be freely adjusted finely, and it can freely reciprocate in a substantially horizontal direction which is perpendicular to the sheet surface in FIG. 1. A shaft 8 substantially horizontally extending in the left-right direction in FIG. 1 is rotatably mounted on the supporting frame 6. A driving source 10 which may be an electric motor is also mounted on the supporting frame 6. The driving source 10 is drivingly connected to the shaft 8 by a suitable power transmission means (not shown). A rotating machining tool 12 is mounted on the free end portion, i.e. the left end portion in FIG. 1, of the shaft 8. The rotating machining tool 12 is constructed of a blade 14 in the form of an annular plate and a pair of supporting flanges 16. By holding the blade 14 between the pair of supporting flanges 16 and fixing the flanges 16 to the shaft 8, the rotating machining tool 12 is mounted on the shaft 8 so as to rotate about the central axis of the shaft 8 together with the shaft 8. As clearly shown in FIG. 1, the outside diameter of the blade 14 is larger than that of the supporting flange 16, and the peripheral edge portion of the blade 14 is projected beyond the peripheral edge of the supporting flanges 16. Conveniently, the blade 14 itself is made by bonding superabrasive grains such as synthetic or natural diamond abrasive grains or cubic boron nitride abrasive grains by a suitable technique such as electrodeposition, resin bonding or metal bonding.

The supporting frame 6 further has provided therein a cooling liquid impinging means 18 including a pair of feed pipes 20 located on both sides of the rotating machining tool 12. Each of the feed pipes 20 extends downwardly behind the rotating machining tool 12, and then forwardly and substantially horizontally in a direction perpendicular to the sheet surface in FIG. 1. The forward end of each of the feed pipes 20 is closed and an impinging hole (not shown) is formed at that part of the pipe 20 which is opposite to the blade 14. The upstream end of each of the feed pipes 20 is connected to a cooling liquid supply source 22 by a suitable means (not shown) such as a flexible hose.

The holder assembly 4 has a holding member 24 having a substantially horizontal upper surface. The holding member 24 is mounted such that it is rotatable about a substantially vertically extending central axis as a center, and is movable in the left-right direction in FIG. 1. Conveniently, at least the central area of the holding member 24 is air-permeable and is caused to communicate selectively with a suction source 26 by a suitable air passage means (not shown).

In the machining device described above, a workpiece, (a semiconductor wafer W in the illustrated embodiment), is placed on the upper surface of the holding member 24. The holding member 24 is caused to communicate with the suction source 26, whereupon the semiconductor wafer W is attracted under vacuum to the upper surface of the holding member 24. On the other hand, the supporting frame 6 of the machining tool assembly 2 is positioned at such a height that the lower end of the blade 14 of the rotating machining tool 12 can act on the semiconductor wafer W as desired. Then, the driving source 10 is energized to rotate the shaft 8 and the rotating machining tool 12 mounted on it at high speeds, for example at least 1500 m/min., in many cases more than 3000 m/min., in terms of the speed of the peripheral edge of the blade 14. Furthermore, the supporting frame 6 of the machining tool assembly 2 is reciprocated in a direction perpendicular to the sheet surface in FIG. 1 by a suitable driving source (not shown), and every time the supporting frame 6 moves forwardly or backwardly in its reciprocating motion, the holding member 24 is caused to make an indexing movement in the left-right direction in FIG. 1 by a suitable driving source (not shown). Consequently, the semiconductor wafer W is cut by the blade 14 of the rotating machining tool 12 along a plurality of parallel cutting lines extending perpendicularly to the sheet surface of FIG. 1. Subsequently, the holding member 24 is rotated by a suitable driving source (not shown) through 90 degrees about its substantially vertically extending central axis as a center, and then the aforesaid reciprocating movement of the supporting frame 6 and the aforesaid indexing movement are carried out. As a result, the semiconductor wafer W is cut by the blade 14 of the rotating machining tool 12 along a plurality of other parallel cutting lines which extend substantially perpendicular to the aforesaid plurality of parallel cutting lines along which the wafer has already been cut. Consequently, the semiconductor wafer W is divided into a number of rectangular areas, i.e. chips. (As is well known to those skilled in the art, the cutting of the semiconductor wafer W may be such that some non-cut thickness remains; or when a tape is applied to the back surface of the semiconductor wafer W, it is possible to cut the semiconductor wafer W through its entire thickness except for this tape). During the cutting operation, a cooling liquid which may be water is supplied to the feed pipes 20 from the cooling liquid supply source 22, and impinged against the blade 14 of the rotating machining tool 12 and the semiconductor wafer W as shown by arrows in FIG. 1 from the impinging holes (not shown) formed in the feed pipes 20.

The aforesaid structure and operation of the illustrated machining device are already known, and only illustratively show one example of the machining device to which the present invention applies. A detailed description of the structure and operation of the illustrated machining device is therefore omitted in the present specification.

According to this invention, a blade inspecting means shown generally at 28 is provided in the machining device described hereinabove. The blade inspecting means 28 in the illustrated embodiment has a detection unit 30 mounted on the supporting frame 6 of the machining tool assembly 2. The detection unit 30 detects the condition of the blade 14 in the rotating machining tool 12 by utilizing electromagnetic radiation, preferably light. The illustrated detection unit 30 is comprised of a detection head 32 and a transmission path means 34 annexed to the detection head 32. With reference to FIG. 2 together with FIG. 1, a light-emitting element 36 and a light-receiving element 38 are accommodated in the detection head 32. The light-emitting element 36 may be formed of a light-emitting diode or the like capable of emitting light which may be infrared light, visible light or ultraviolet light. The light-receiving element 38 may be formed of a phototransistor or the like capable of producing an electrical signal corresponding to the light received The transmission path means 34 includes a first light transmission means 40 which may be formed of one or a plurality of optical fibers and a second light transmission means 42 which likewise may be formed of one or a plurality of optical fibers. The first light transmission means 40 extends from its input terminal optically connected to the light-emitting element 36 to its output terminal located in proximity to the blade 14. Likewise, the second light transmission means 42 extends from is input terminal located in proximity to the blade 4 to its output terminal optically connected to the light receiving element 38. In the illustrated embodiment, a greater part of the first light transmitting means 40 including its output terminal portion (i.e., its greater part excluding its input terminal portion) and a greater part of the second light transmitting means 42 including its input terminal portion (i.e., its greater part excluding its output terminal portion) are disposed adjacent to each other and covered by a common tubular protective sheath 44 which is conveniently flexible. Preferably, the tubular protective sheath 44 is mounted on the supporting frame 6 by a suitable mounting means (not shown) so that the relative position of its forward end, and therefore the output terminal of the first light transmission means 40 and the input terminal of the second light transmission means 42, to the blade 14 can be finely adjusted. The light-receiving element 38 in the detection head 32 is electrically connected to one input terminal of a comparator 48 through an amplifier 46. To the other input terminal of the comparator 48 is electrically connected a standard voltage source 50 which is desirably adjustable. The output terminal of the comparator 48 is electrically connected to a warning means 52 which may be an alarm lamp or an alarm buzzer.

The operation of the blade inspecting means 28 described above will be described. When the light-transmitting element 36 is energized, it emits light. The light is transmitted through the first light transmission means 40 and from the output terminal of the first light transmission means 40, irradiated onto the blade 14. The irradiated light is reflected by the blade 14 and comes into the input terminal of the second light transmitting means 42. The light is then transmitted by the second light transmitting means 42 and irradiated on the light-receiving element 38. It will be easily seen from FIGS. 1 and 2 that when the blade 14 is in a proper condition, the light irradiated onto the blade 14 from the output terminal of the first light transmitting means 40 is fully reflected and falls upon the input terminal of the second light transmission means 42. Consequently, the light-receiving element 38 receives a relatively large amount of light and produces a relatively high output voltage. However, when the blade 14 has been worn beyond a predetermined amount through long-term use or for some reasons or other, the blade 14 is deformed (e.g., bent) or broken, the state of reflection of light by the blade 14 varies, and the quantity of light reflected by the blade 14 and falling upon the input terminal of the second light transmission means 42 decreases. This results in a decrease in the quantity of light received by the light-receiving element 38 and in the magnitude of the output voltage produced by the light-receiving element 38. When the output voltage of the light-receiving element 38 falls below a threshold value defined by the standard voltage source 50, the comparator 48 produces an output signal to energize the warning means 52. As a result, the operator is warned of the fact that the blade 14 is in an improper condition and should therefore be replaced. If desired, the above blade inspecting means may be constructed such that the operation of the machining device can be automatically stopped when the comparator 48 produces the output signal.

In the illustrated embodiment, the emitting means consisting of the light-emitting element 36 and the first light transmission means 40 and the receiving means consisting of the light-receiving element 38 and the second light transmission means 42 are both disposed on one side of the blade 14, and the electromagnetic radiation (i.e., light) from the emitting means is reflected by the blade 14 and received by the receiving means. If desired, it is possible to dispose the emitting means on one side of the blade 14 and the receiving means on the other side. In this case, when the blade 14 is in a proper condition, all or a part of the electromagnetic radiation from the emitting means is blocked by the blade 14, and little or no electromagnetic radiation falls upon the receiving means. On the other hand, when the blade 14 has been worn beyond a predetermined amount or deformed or broken, the amount of blocking of the electromagnetic radiation from the light emitting means is decreased at least locally, and therefore, the amount of the electromagnetic radiation received by the receiving means increases. The comparator 48 produces an output signal when the amount of the electromagnetic radiation received by the receiving means increases and exceeds the threshold value.

In the illustrated embodiment, the blade 14 is in the form of a circumferentially continuous annular plate, but the present invention can be applied to blades in other forms, for example a blade in such a form that a plurality of diametrically extending slits are formed at circumferentially spaced intervals. With the blades having slits formed therein, the amount of electromagnetic radiation which the receiving means receives varies owing to the presence of the slits. Since, however, the blade is rotated at high speed, if the circumferential width of each slit is relatively small, the aforesaid variation in the amount of electromagnetic radiation received by the receiving means is only instantaneous and is faster than the limit of the response speed of an ordinary amplifier 46 and comparator 48. Accordingly, the comparator 48 does not produce an output signal according to the variation in the amount of electromagnetic radiation received by the receiving means.

In the illustrated machining device, a cooling liquid such as water is impinged against the blade 14 and the semiconductor wafer W from the impinging holes (not shown) formed in the feed pipes 20 during the cutting of the semiconductor wafer W by the blade 14, as stated hereinabove. A fog generated by the impinging of the cooling water will float in the light path between the blade 14 and the input terminal of the first light transmission means 40 and/or the light path between the blade 14 and the input terminal of the second light transmission means 42, or adhere to the output terminal of the first light transmission means 40 and/or the input terminal of the second light transmission means 42. It is likely that the light will be scattered by the fog and the amount of the light received by the receiving element 38 will be varied. Furthermore, fine cutting dusts formed as a result of cutting the semiconductor wafer W by the blade 14 are likely to scatter the light similarly and vary the quantity of light received by the light-receiving element 38. If the amount of light received by the light-receiving element 38 is varied by the fog and/or cutting dusts, the reliability of inspection of the blade 14 by the blade inspecting means 28 tends to be reduced.

In the modified example shown in FIG. 3, a gas stream generating means 54 is further provided in the blade inspecting means 28 in order to solve the aforesaid problem. The gas stream generating means 54 includes a gas stream supply pipe 56. A tubular impinging port 58 located at the forward end portion of the gas stream supply pipe 56 concentrically surrounds the forward end portion of the tubular protective sheath 44 that covers the output terminal portion of the first light transmission means 40 and the input terminal portion of the second light transmission means 42. The upstream end of the gas supply pipe 56 is connected to a gas supply source 60 such as a blower. In this gas stream generating means 54, a gas which may be air is supplied from the gas supply source 60 through the gas stream feed pipe 56. As shown by the arrows in FIG. 3, the gas from the tubular impinging port 58 impinges against the blade 14 in a direction substantially parallel with the direction of the light passing to and from sheath 44. The impinged gas stream surrounds a space between the forward end of the tubular protective sheath 44 and the blade 14, and prevents the aforesaid fog and/or cutting dusts from entering the space between the tubular protective sheath 44 and the blade 14. Hence, the gas stream accurately prevents the fog and/or cutting dusts from floating in the light path between the blade 14 and the output terminal of the first light transmitting means 40 and/or the light path between the blade 14 and the input terminal of the second light transmitting means 42, or from adhering to the output terminal of the first light transmitting means 40 and/or the input terminal of the second light transmitting means 42.

If desired, the above problem can be solved or alleviated by providing the tubular impinging port 58 of the gas stream supply pipe 56 separately from the tubular protective sheath 44, as depicted in FIG. 4, and impinging the gaseous stream into the space between the tubular protective sheath 44 and the blade 14 from the tubular impinging port 58 in a direction substantially normal to the light path. Or the above problem can be solved or alleviated by sucking air instead of impinging the gaseous stream from the tubular impinging port 58, and thus producing an air stream in the space between the forward end of the sheath 44 and the blade 14.

While some specific embodiments of the machining device constructed in accordance with this invention have been described in detail with reference to the accompanying drawings, it should be understood that the invention is not limited to these specific embodiments and various changes and modifications are possible without departing from the scope of this invention.

What is claimed is:

1. A machining device comprising a rotatable machining tool mounted for rotation about a central axis as a center; a blade on said rotatable machining tool; a driving source for rotating said rotatable machining tool; a holding member for holding a workpiece, said holding member and said machining tool being adapted to be moved relative to each other to permit the blade to act on a workpiece held by the holding member as the machining tool rotates; cooling liquid impinging means for impinging a cooling liquid against the blade and the workpiece; blade inspecting means including emitting means for emitting electromagnetic radiation and receiving means for receiving the electromagnetic radiation from the emitting means and producing a signal corresponding to the received electromagnetic radiation, said emitting means and receiving means being disposed such that the electromagnetic radiation emitted from the emitting means undergoes interference by the blade of the machining tool and the electromagnetic radiation received by the receiving means is varied according to the condition of the blade; and gas stream generating means for generating a gas stream in the path of the electromagnetic radiation between the emitting means and the receiving means and the blade or in the vicinity of said path, said gas stream preventing fog generated by impinging of the cooling liquid and dust formed by machining the workpiece from floating in the path.

2. The machining device of claim 1 wherein the receiving means receives electromagnetic radiation reflected by the blade.

3. The machining device of claim 1 wherein the electromagnetic radiation emitted by the emitting means is light.

4. The machining device of claim 3 wherein the emitting means is comprised of a light-emitting element and first light transmitting means having an input terminal optically connected to the light-emitting element and extending therefrom to an output terminal located in proximity to the blade, and the receiving means is comprised of a light-receiving element and second light transmission means having an input terminal located in proximity to the blade and extending therefrom to an output terminal optically connected to the light-receiving element.

5. The machining device of claim 4 wherein the first and secohd light transmission means consist of optical fibers.

6. The machining device of claim 1 wherein the blade is in the form of an annular plate for cutting a semiconductor wafer.

7. The machining device of claim 1 wherein the gas stream generating means impinges the gas in a direction substantially normal to the path of the electromagnetic radiation.

8. The machining device of claim 1 wherein the gas stream generating means generates a stream of air.

9. The machining device of claim 8 wherein the emitting means is comprised of a light-emitting element and first light transmission means having an input terminal optically connected to the light-emitting element and extending therefrom to an output terminal located in proximity to the blade; the receiving means is comprised of a light-receiving element and second light transmission means having an input terminal located in proximity to the blade and extending therefrom to an output terminal optically connected to the light receiving element, at least the output terminal of the first light transmission means and at least the input terminal of the second light transmission means being arranged adjacent to each other so that light from the output terminal of the first light transmission means is reflected by the blade and falls upon the input terminal of the second light transmission means; and wherein the gas stream generating means has a tubular impinging port which surrounds at least the output terminal of the first light transmission means and at least the input terminal of the second light transmission means.

10. The machining device of claim 1 wherein the gas stream generating means impinges the gas in a direction substantially parallel to the path of the electromagnetic radiation.

* * * * *